Figure 1:
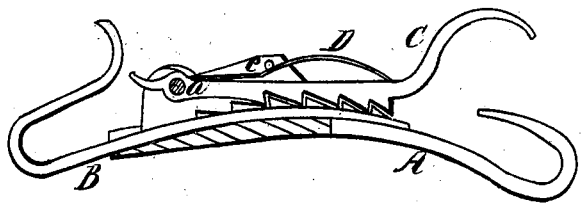
Figure 2:
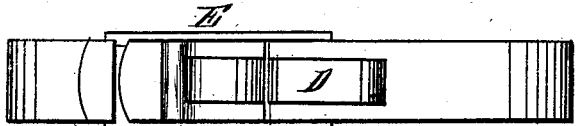
Figure 3:
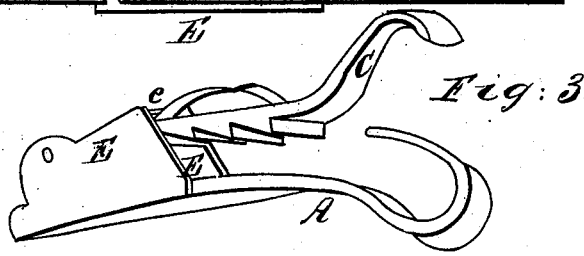

A. Palmer,
Hame Fastener.
Nº 71,209. Patented Nov. 19, 1867.

Witnesses.

Inventor.
Alonzo Palmer
per
Alexander Mason
Atty

United States Patent Office.

ALONZO PALMER, OF HUDSON, MICHIGAN.

Letters Patent No. 71,209, dated November 19, 1867.

IMPROVED HAMES-FASTENER.

The Schedule referred to in these Letters Patent and making part of the same.

TO ALL WHOM IT MAY CONCERN:

Be it known that I, ALONZO PALMER, of Hudson, in the county of Kalamazoo, and in the State of Michigan, have invented certain new and useful Improvements in Hames-Fastener; and do hereby declare that the following is a full, clear, and exact description thereof, reference being had to the accompanying drawings, and to the letters of reference marked thereon:

In the annexed drawings, making part of this specification, A, B, and C represent three bars, which, together with the spring D, form the several parts of this fastener. The bars A and B have hooks formed on their outer ends. Bar A is provided at one end with two ears, E E. The bar C, which is provided with ratchet-teeth on its inner side, is pivoted near one end between the ears E, as seen at $a$. D represents a spring, secured at one end upon the outside of bar C. This spring is curved, and lies under a pin, $e$, which runs across from one ear to the other. The bar B is provided on one side with ratchet-teeth to correspond with those of bar C. This bar B slides under bar C and between the two ears E E, and the teeth of the two bars are caused to catch into each other by the spring D.

As there is a series of teeth upon these bars, it will be seen that when they are caught together several teeth of each bar are engaged, thus making a very strong fastener. When it is desired to disengage the two parts A and B, it is only necessary to raise the outer end of bar C, that is, move it from toward bar A, and the teeth separate so that they can readily be drawn apart. The hooks of the bars A and B catch into the eyes in the lower ends of the two parts of the hames. The hames are tightened or loosened by thrusting in or drawing out the bar B to suit the nature of the case.

Having thus fully described my invention, what I claim as new, and desire to secure by Letters Patent, is—

The bars A, B, and C, and spring D, constructed and arranged to operate in the manner and for the purposes set forth.

In testimony that I claim the foregoing I have hereunto set my hand this 10th day of September, 1867.

ALONZO PALMER.

Witnesses:
LORENZO PALMER,
A. W. OCOBOCK.